Feb. 25, 1964 R. M. CENTNER ETAL 3,122,691
DIGITAL CONTOURING SYSTEM WITH AUTOMATIC FEED RATE CONTROL
Filed March 1, 1962 3 Sheets-Sheet 1

INVENTORS.
JOHN L. McKELVIE
BY RONALD M. CENTNER

ATTORNEY

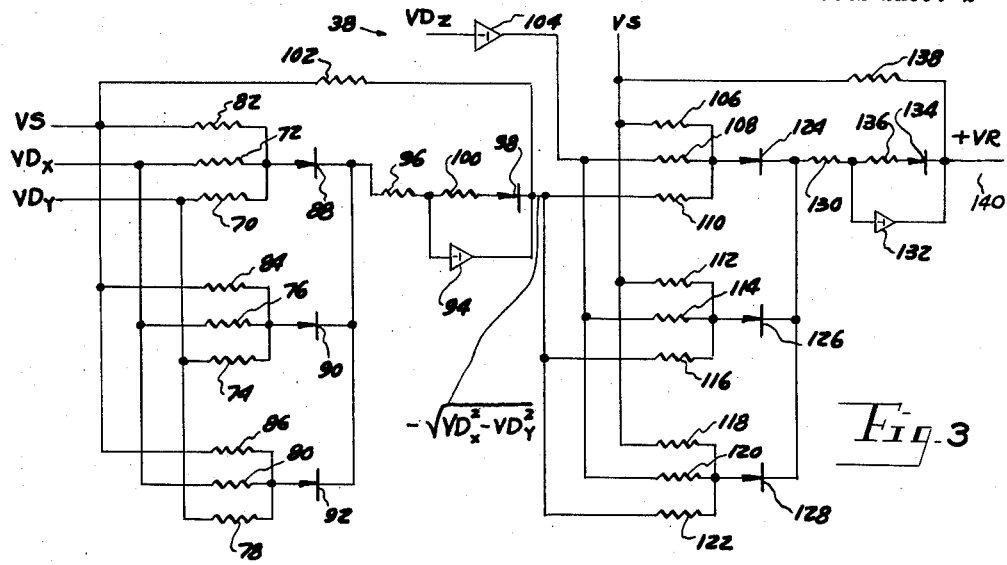
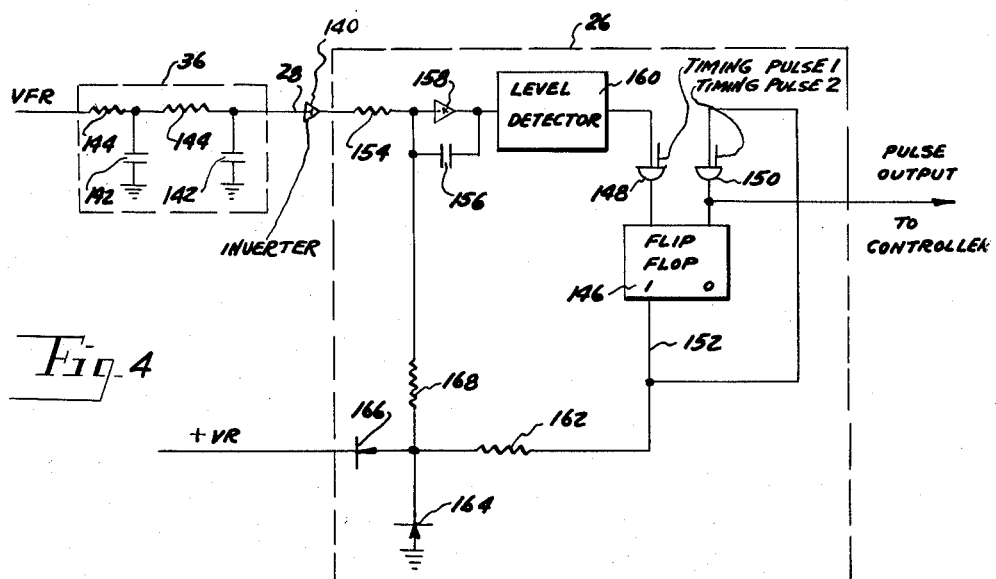
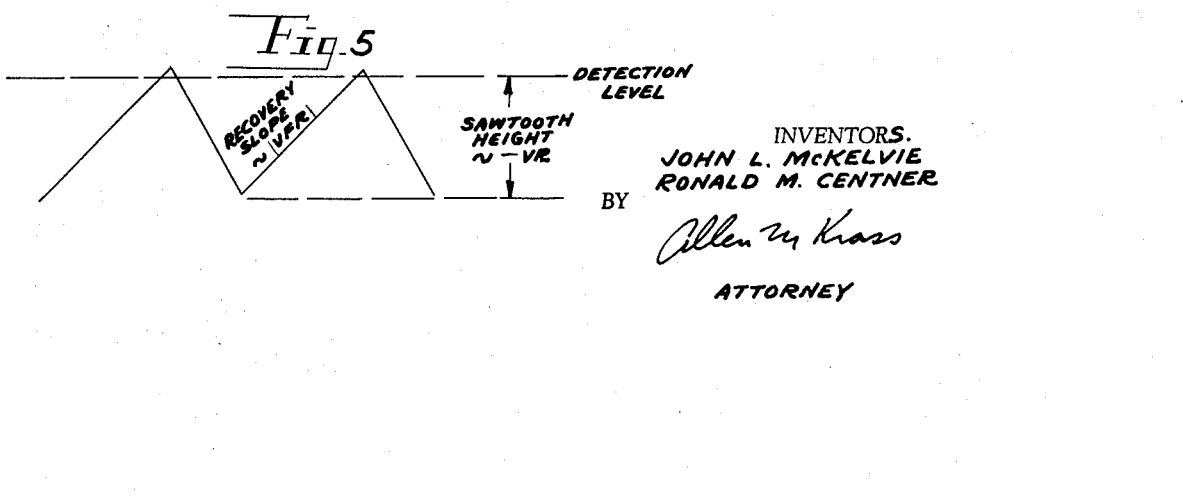

Feb. 25, 1964  R. M. CENTNER ETAL  3,122,691
DIGITAL CONTOURING SYSTEM WITH AUTOMATIC FEED RATE CONTROL
Filed March 1, 1962  3 Sheets-Sheet 3

INVENTORS.
JOHN L. McKELVIE
BY RONALD M. CENTNER

ATTORNEY

United States Patent Office 3,122,691
Patented Feb. 25, 1964

3,122,691
DIGITAL CONTOURING SYSTEM WITH AUTOMATIC FEED RATE CONTROL
Ronald M. Centner and John L. McKelvie, Royal Oak, Mich., assignors to The Bendix Corporation, Detroit, Mich., a corporation of Delaware
Filed Mar. 1, 1962, Ser. No. 176,583
11 Claims. (Cl. 318—162)

This invention relates to a digital position control system of the contouring type having automatic internal means for controlling the motion rate of its output device.

Numerical contouring control systems generally receive information from a record medium such as punched tape and convert that information into electrical form in order to control a plurality of servomechanisms which operate to move an output device along a plurality of axes simultaneously. The tape normally contains data relating to a plurality of incremental motions which may each constitute a straight line or a simple curve such as a circle. The output device is positioned along a more complex contour by causing it to move through a sequence of the shorter incremental motions.

In such a system the tape contains a plurality of "blocks" of information, each of which is operative upon the system to command a particular increment of motion. Each block contains the end coordinates of an incremental motion and for other than straight line motions may contain other information relating to the curve. The block will also contain the coded form of a signal which determines the rate at which the incremental motion is to be performed. This "feed rate number" is calculated by the part programmer or by the computer employed in tape preparation, from information relating to the desired motion rate of the output device and the length of the incremental motion associated with the block.

In order to relieve the programmer of the work of calculating the feed rate number for each incremental motion block, it has previously been proposed to provide control circuitry which would simply accept information relating to the desired feed rate in such units as inches per minute and would itself determine the necessary rate of generation of electrical signals for control of the servomechanisms at appropriate speeds. The previously proposed systems operated by monitoring the motion command signals to the servomechanisms and performing analog operations on these signals to calculate the actual feed rate that the control was commanding. This actual feed rate was compared with the desired feed rate and an error signal was developed which was used to control the speed of operation of the "controller" section of the circuitry which develops the signals for the servomechanisms. This prior art attempt to solve the automatic feed rate problem had two major weaknesses. First, the electrical circuitry which performed the task of monitoring the signals to the servomechanisms and developing the actual feed rate from these signals was inherently complex, expensive and inaccurate. Secondly, in this system it was necessary to develop an actual feed rate before the feedback loop would be operative to correct that feed rate. Thus, there was a definite, relatively large time lag before the feed rate of the system was estabilshed at the desired value.

The present invention has as its primary object to provide an automatic feed rate control system which is inherently simple and inexpensive to implement electronically so as to enjoy the inherent reliability associated with simple circuitry.

It is a further object of the present invention to provide an automatic feed control system which is operative to develop the desired feed rate in the beginning of each block without the time delay associated with a closed loop control.

A preferred embodiment of the present invention, which is described in detail in the following specification, employs a variable frequency pulse generator to feed the controller circuitry and thus determine the rate of generation of servomechanism signals and the output motion rate of the servomechanisms. The variable frequency pulse generator is of a novel variety which may be controlled as a function of the amplitude ratio of a pair of input voltages. In the preferred embodiment, the variable frequency pulse generator is controlled as a direct function of the value of the feed rate in inches per minute as received from the tape. The variable frequency pulse generator is also controlled as an inverse function of the length of the incremental motion path that the system is controlling. The length of this path is calculated by analog circuitry which combines the commanded motions along each of the controlled axes in order to calculate the resultant normalized path length. The motion lengths along each coordinate are derived directly from the electrical representations of the information contained on the tape rather than from the signals transmitted by the controller to the servomechanisms. In this manner the system develops the proper feed rate at the beginning of each incremental motion. In certain control systems the raw motion length data from the tape is converted into a form compatible for use with the controller circuitry. In such cases the converted command numbers are proportional to the original path lengths and will be termed "normalized" path lengths.

The present invention has as a further object to provide an automatic feed rate control system which is compatible with a system employing "pulse multiplication." In a certain class of control systems, such as the type described in U.S. Patent No. 3,002,115, this pulse multiplication technique is utilized to allow the controller circuitry to operate at a fraction of the rate at which pulses must be provided to the controlling servomechanisms. In order to accomplish this, a multiplier unit accepts the pulses from the controller and provides as an output a multiple of pulses for each input pulse. In order to adapt automatic feed rate control to such a system an alternate embodiment of the present invention, which is described in the subsequent specification, utilizes the same signal which controls the multiplication factor of the pulse multiplier to control a pulse divider disposed between the variable frequency pulse generator and the controller. Thus, if the pulse multiplier is doubling the effective pulse rate the divider reduces the pulse rate received at the controller by one-half in order to maintain a proper ultimate feed rate.

The present invention has as a further object to provide automatic feed rate control systems of the type described which provide a smooth acceleration between motions which must be accomplished at varying feed rates. For example, when the output device must traverse a sharp corner, it is normally desirable to reduce its feed rate. The embodiments described include means for providing transition between such sections having differing motion rates without any sharp steps in either the velocity or the acceleration of the positioned device.

A still further object of the present invention is to provide a system of the type described wherein means are provided for varying the feed rate as a function of certain physical characteristics of the operation. By way of example, when the system is utilized to position the cutter of a machine tool such variables as cutter temperature, chip temperature or cutter torque may be used to modify the initially programmed cutter rate in order to control the machine in an optimal manner. Thus, the feed rate might be modified in such a manner as to continually increase until a desired force on the cutter tool is experienced and to decrease below the programmed value when the force on the cutter exceeds desirable limits.

Other objects, advantages and applications of the present invention will be made apparent by the following detailed description of a preferred embodiment to alternatives thereto. The description makes reference to the accompanying drawings in which:

FIG. 3 is a schematic representation of that portion of the circuitry of FIG. 1 which generates the resultant commanded motion length from the motion lengths along each axis;

FIG. 4 is a schematic representation of the variable frequency pulse generator utilized in connection with the embodiment of FIG. 1;

FIG. 5 is a graph clarifying the operation of the variable frequency pulse generator of FIG. 4;

Figure 1:
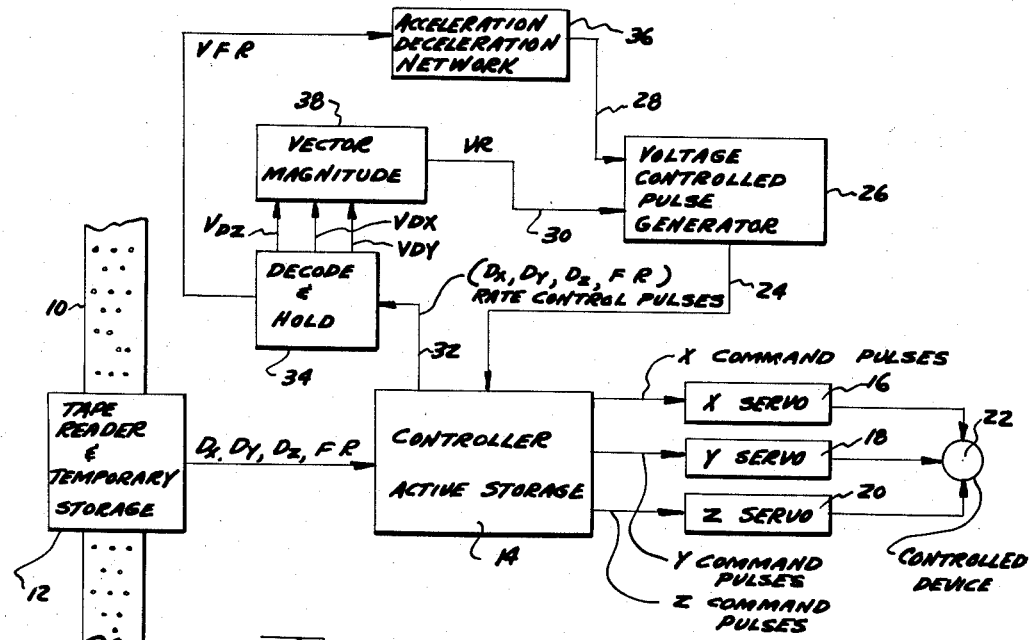
FIG. 1 is a block diagram of a preferred embodiment of a system incorporating the present automatic feed control.

Referring to the embodiment of FIG. 1, a system is disclosed which operates in the same broad manner as that disclosed in U.S. Patent No. 3,002,115 except that it does not include pulse multiplication. Those details of operation of the present system which are not novel are therefore not described herein and may be of the form indicated in the other patent or may utilize features of other known systems.

Referring to the embodiment of FIG. 1, the system is controlled in accordance with information contained on a punched tape 10. The tape programming of the present invention differs from that described in the patent only in that a "feed rate number" need not be associated with each block but rather a number directly indicative of the feed rate must be associated with the initial block of a tape and with only such subsequent blocks as require a change in this feed rate. As a practical matter if the programmer does not include the feed rate with each information block, the control must include a storage unit operative to retain the last feed rate until a new feed rate is provided.

The tape 10 is passed through a reader and temporary storage unit 12 which establishes electrical representations of the information contained on the tape and stores it until it is required for use by the controller and active storage system 14. The information transferred between tape reader 12 and the controller 14 includes, but is not limited to, the digital representations of the motion components along the three axes over which the device provides positioning control. These three numbers are respectively termed $Dx$, $Dy$, and $Dz$. The information transferred also includes the feed rate, FR.

The controller 14 has the function of developing three pulse trains which are transmitted to the X servomechanism 16, the Y servomechanism 18, and the Z servomechanism 20. These servomechanisms provide output motions through distances which are functions of the number of pulses they receive at rates proportional to the frequency of their input pulse trains. The servomechanisms jointly act to move an output device 22.

The controller 14 acts to generate pulses at a rate which is directly proportional to the frequency of a pulse train received on line 24 from a voltage controlled pulse generator 26. It is the function of the novel circuitry of the present invention to control the generator 26 in accordance with data provided by the tape 10 in such a manner as to cause the controller 14 to generate output pulse trains at such rates as will provide a proper ultimate motion rate of the controlled device 22.

The voltage controlled pulse generator 26 is of a novel variety which is controlled as a function of voltages received at input lines 28 and 30. The voltage received on the line 28 is proportional to the desired feed rate to be achieved by the system and the pulse generator 26 is controlled to operate at a rate which is directly proportional to this voltage. The voltage received on the input line 30 is proportional to the normalized length of the resultant motion path commanded by the three coordinate motions along the X, Y, and Z axes. Since the controller 14 acts to generate output pulses at a rate proportional to the pulse rate on line 24 and the lengths of the incremental motions along the coordinate axes, the voltage controlled pulse generator 26 must operate at a rate which is inversely proportional to the resultant path length and therefore inversely proportional to the voltage received on the line 30. Thus, it may be said that the generator 26 provides an output pulse train of a frequency proportional to the ratio between the desired feed rate and the resultant path length. The circuitry of the pulse generator is disclosed in detail in FIG. 4.

Both of the signals on the lines 28 and 30 are developed from information contained on the tape and retained in the active storage section of the controller 14. This information is provided in serial digital form on line 32 to a decode and hold unit 34. The unit 34 acts to generate static analog representations of $Dx$, $Dy$, $Dz$, and FR from the serial digital representations which it receives. These analog voltages are respectively termed $VDx$, $VDy$, $VDz$, and VFR.

VFR is provided to the line 28 through an acceleration/deceleration network 36 which simply constitutes a low-pass filter which smooths VFR so as to eliminate any sharp discontinuities in the feed rate. It acts to establish a smooth transition between different feed rates associated with different blocks of information and the discontinuities in feed rate which occur at the beginning and end of a contouring motion.

The voltages $VDx$, $VDy$, and $VDz$ are fed to a vector magnitude circuit 38. This circuit combines the three voltages in a geometric fashion so as to derive a voltage VR which has a magnitude proportional to the normalized length of the resultant path to be executed by the output device 22 as a result of the three component motions $Dx$, $Dy$, and $Dz$. This voltage VR is supplied on the line 30 to the pulse generator 26 and as has been noted controls the pulse generator rate in an inverse fashion.

The novel sections of the control system of FIG. 1 are thus seen to calculate the resultant motion length from tape supplied data to develop a first voltage; calculate the desired feed rate from tape supplied data to generate a second voltage which is filtered in order to provide a third voltage, and then vary the output frequency of a voltage controlled oscillator in inverse ratio to the first voltage and in direct ratio to the third voltage.

Figure 2:
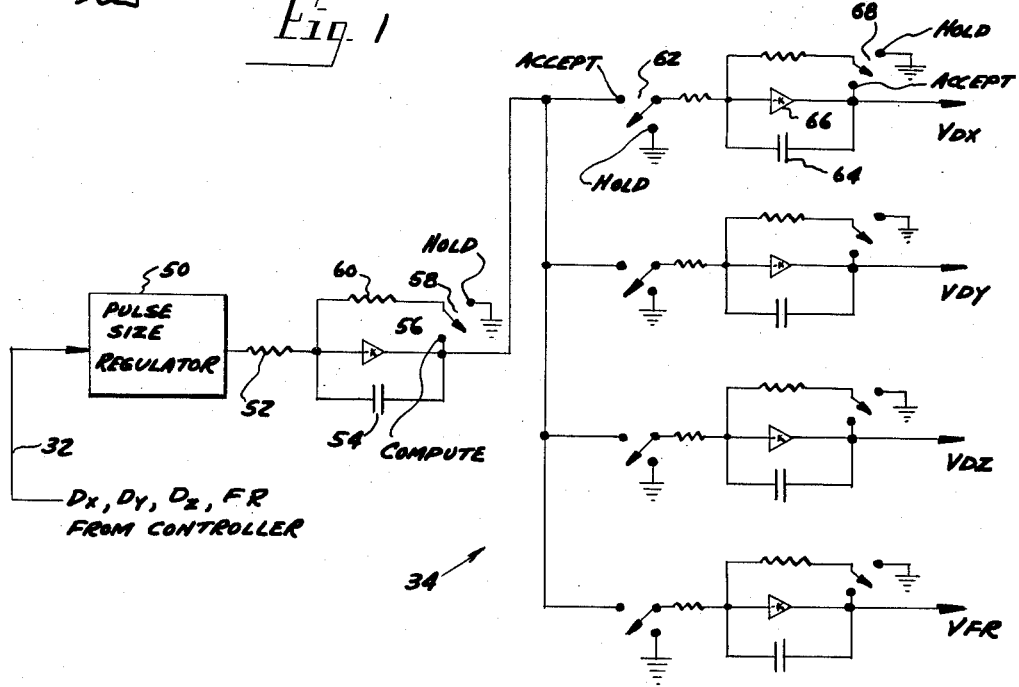
FIG. 2 is a partial block, partial schematic representation of that part of the circuitry of FIG. 1 which develops analog voltages from information contained on the tape.

The circuitry of the more novel aspects of the system of FIG. 1 will be now described in greater detail. FIG. 2 broadly represents the circuitry of the decode and hold unit 34. As has been noted, the unit 34 receives serial digital representations of D$x$, D$y$, and D$z$ and FR from the controller 14 and creates static analog representations of those voltages. The signals D$x$, D$y$, D$z$ and FR, which occur in serial binary form, are first passed through a pulse size regulator 50, which reshapes them. Assuming that D$x$ is being transmitted to the pulse size regulator first in serial binary form with its least significant bit leading, it is passed through a resistance 52 and acts to charge a condenser 54. The condenser 54 is shunted by an operational amplifier 56 which assures that the input point to the capacitor 54 remains at virtual ground potential to prevent the charge on 54 from blocking additional charge input. When a transistor switch 58 is in the "compute" position, as it is when D$x$ is being received, a resistor 60 also shunts the capacitor 54. The time constant of this RC circuit is such that 50% of the charge on the capacitor decays during the time occupied by each bit in the word D$x$. Therefore, after the receipt of $n$ bits, $n$, $n-1$, $n-2$ . . . 3, 2, 1, each of a voltage $x$, the charge on the capacitor 54 will be $x_1$ plus $x_2/2$ plus $x_3/4$ plus . . . $x_n/2^{n-1}$, where each $x$ has the value 1 or 0 depending on the presence or absence of a 1 at the corresponding bit position in the binary word. This is equal to the analog value of D$x$.

After all the digits in D$x$ have been received, the switch 58 is returned to the "hold" position which disconnects resistor 60 and causes the charge on the capacitor 54 to be retained. Two transistor switches 62 and 68 are then pulsed to the "accept" position. This allows a capacitor 64 to become charged to a value proportional to the charge on capacitor 54. After a sufficient time has elapsed to charge the capacitor 64 to very nearly the voltage of the capacitor 54, switches 62 and 68 are returned to "hold" position. The operational amplifier 66 provides a long time constant, permitting capacitor 64 to retain its charge until the next entry of D$x$ data. The voltage across the capacitor 64 now constitutes the VD$x$ which provides one input to the vector magnitude circuit 38.

Circuits identical to that formed by the components 62, 64, 66, 68 are also connected by switches to the capacitor 54 to accept and hold the voltages VD$y$, VD$z$, and VFR. If these words follow each other immediately in serial fashion on the line 32, the capacitor 54 will miss the first few bits of each word while it is transferring the analog value of the previous word to its "hold" circuit. However, if the word has a sufficient number of bits this loss will not be of significance because the least significant bits are processed first.

The three analog quantities, VD$x$, VD$y$, and VD$z$ are transferred to the vector magnitude circuit 38 which generates an analog quantity representative of the geometric sum of three quantities taken as distances along orthogonal coordinate axes. This circuit is disclosed schematically in FIG. 3. Broadly, circuit 38 computes the resultant sum of VD$x$ and VD$y$ and then operates upon the resultant of this operation and VD$z$ to compute the total system resultant.

The nature of the circuit employed is disclosed in the 1958 I.R.E. WESCON Convention Record, part 4, page 123, "Network Solution of the Right Triangle Problem," by M. R. Winkler. A circuit solves the equation $VR = VX \cos \theta + VY \sin \theta$ where $\theta$ equals the resultant angle. Since $\theta$ is unknown, the circuit solves the equation for three representative values, which may be 15, 45 and 75 degrees, and then accepts the largest of the three results as the best vector sum. The referenced report discloses that the maximum theoretical error in such an operation will be $-3.4\%$ and will occur at $\theta$ equals 0, 30, 60 and 90 degrees. The accuracy of the circuit may be increased by performing calculations at additional intermediate angles.

As illustrated in FIG. 3, the quantities VD$x$ and VD$y$ are introduced to each of three resistor pairs; 70 and 72, 74 and 76, and 78 and 80. The resistor values are chosen to attenuate the input voltages as a function of the respective sines and cosines of the angles chosen. A third voltage V$s$ is added to each resistor pair through resistors 82, 84 and 86. The voltage V$s$ acts to supply constant offset current to maintain the circuit operation within the linear portion of the voltage-current characteristics of the diodes employed.

The voltages associated with each resistor set are fed to diodes 88, 90 and 92, which choose the largest value. This is fed through an inverting summing amplifier 94 through a resistance 96. The amplifier 94 has a diode 98 and a resistor 100 shunting it. The diode 98 compensates for non-linearity and thermal drift in the other diodes. The amplifier 94 feeds back to the resistors 82, 84 and 86 through a resistor 102.

The output of the amplifier 94 is therefore equal to the negative resultant of the voltages VD$x$ and VD$y$. This resultant is summed with $-$VD$z$, which is obtained through use of an inverting amplifier 104, in a similar circuit which employs three resistance sets, 106, 108 and 110; 112, 114 and 116; and 118, 120 and 122. These resistor sets feed three diodes 124, 126 and 128 which, in turn, pass the largest sum through a resistor 130 to a negative operational amplifier 132. The circuit is completed by a diode 134 and resistor 136 which shunt the amplifier 132 and a feedback resistor 138.

The signal VFR is passed to the pulse generator 26 through the acceleration/deceleration control 36 which is a low-pass filter consisting for example of a pair of capacitors 142 and resistors 144 connected in a two-section circuit. This circuit smooths out velocity and acceleration steps in the feed rate voltage.

The voltage controlled pulse generator 26 broadly constitutes a sawtooth generator, which saw tooth has an upward recovery slope proportional to the magnitude of VFR and a downward slope related to the magnitude of VR. It is centered about a bi-stable multivibrator (flip-flop) 146 which has switching inputs from two "and" gates 148 and 150. Each of the "and" gates 148 and 150 has a second input from one of two timing pulse sources in the associated circuitry. The two timing pulse lines connected to the gates go high in succession at spaced intervals with respect to one another. The high output of the flip-flop in line 152 is fed back to form the other input to the "and" gate 150 so that the multivibrator 146 resets itself shortly after firing.

The voltage VFR on line 28 is fed through an inverting amplifier 140 and a resistor 154 to a capacitor 156. An operational amplifier 158 which shunts the capacitor prevents the loading of the capacitor. The combination of the amplifier 158 and capacitor 156 makes up a conventional integrating amplifier. The voltage output of the integrator is sensed by a level detector 160, of conventional construction. When a preset voltage is reached, the detector 160 provides the other input to the "and" gate 148 which triggers the flip-flop. When the flip-flop goes high, it provides a pulse through a resistor 162 to a network comprising diodes 164 and 166 and a resistance 168. The resistance 168 is connected to the input of the integrator. When a positive pulse is received the integrator output slope is determined by the difference between VFR and VR. The resistors 168 and 154 are selected so that the slope is always downward during this time. As soon as the flip-flop has reset itself upon the occurrence of the second timing pulse, the positive pulse disappears and the integrator output slope is determined solely by VFR. When a voltage sufficient to trigger the level detector is reached, the flip-flop again fires. The resultant voltage wave form at the integrator output is illustrated in FIG. 5. Since the upward recovery slope of the saw tooth is proportional to the magnitude of the voltage VFR while the height of the saw tooth is proportional to the magnitude of the voltage VR, the frequency of the saw tooth is proportional to the ratio of these two voltages. A pulse output of rate equal to the sawtooth frequency is provided from the output of the "and" gate 150. This is the pulse output which feeds the controller. It should be understood that other forms of variable frequency pulse generators might supplant the preferred circuitry described in connection with the unit 26.

Figure 6:
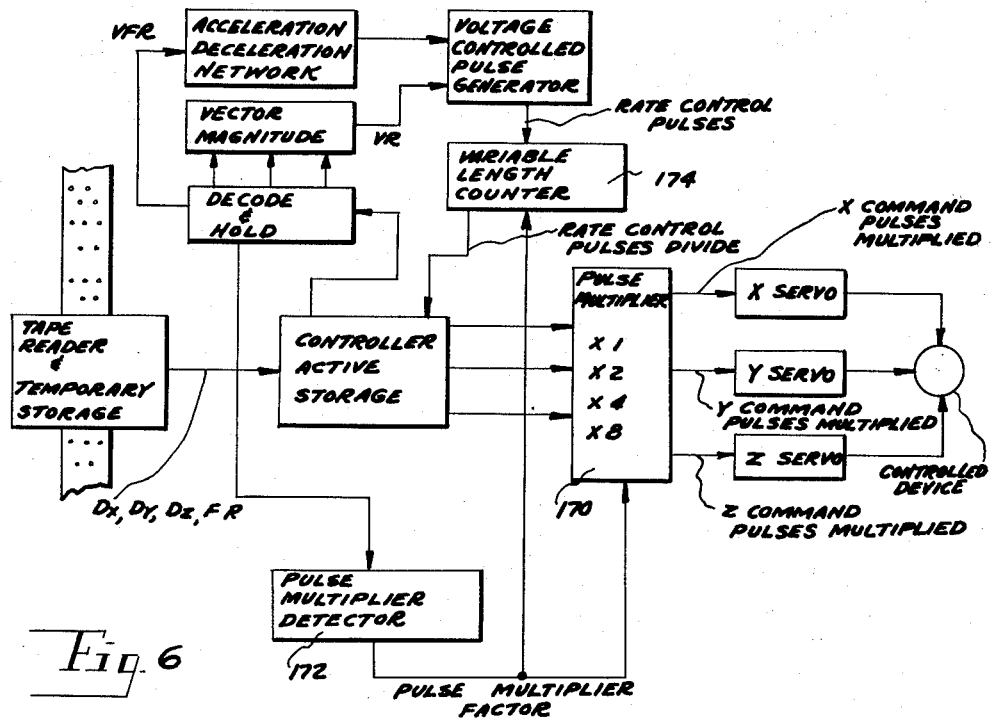
FIG. 6 is a block diagram of an embodiment of the invention as contained in a system employing pulse multiplication.

FIG. 6 illustrates in block diagram form the application of the automatic feed rate control to a system employing a pulse multiplier between the output of the controller and the servomechanisms. The system of FIG. 6 is the same as the system of FIG. 1 except in the addition of those blocks which are numbered in FIG. 6. A pulse multiplier unit 170 receives the X, Y and Z command pulses from the controller and generates three pulse trains, each having an even multiple of the number of received pulses, to the X, Y and Z servomechanisms. This enables the controller circuitry to operate at some fraction of the necessary pulse rate. The proper multiplication factor is calculated by a pulse multiplier detector circuit 172 in a manner disclosed in U.S. Patent No. 3,002,115. In addition to setting the pulse multiplier factor of the unit 170, this detector 172 controls a variable length counter 174 which is inserted between the variable frequency pulse generator and the controller. The variable length counter acts as a divider to divide the pulses fed to the controller by the same factor that unit 170 multiplies the pulses emanating from the controller. In this manner, the automatic feed rate control circuitry may operate without regard to the pulse multiplication factor.

In order to preclude the need for a sudden excessive rise in the output rate of the voltage controlled pulse generator when programmed feed rate is reduced from one value to another involving a lower pulse multiplication factor, it is necessary for the pulse multiplier detector 172 to store the pulse multiplication factor associated with the previous block as well as that associated with the block being operated upon, and to utilize the larger of the two in controlling the pulse multiplier and the variable length counter. Simple logic circuitry (not shown) may accomplish this.

Figure 7:
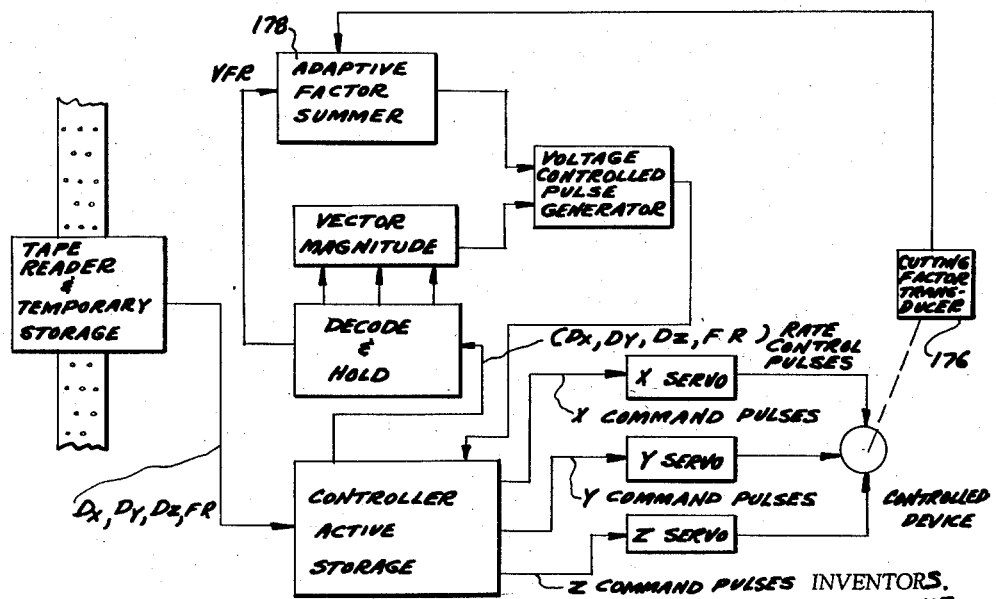
FIG. 7 is a block diagram of a third embodiment of the system wherein the programmed feed rate is varied as a function of the operating variables of the system.

FIG. 7 illustrates a system incorporating automatic feed rate control with means for automatically adapting the feed rate to the cutting conditions. The system differs from that of FIG. 1 in that a cutting factor transducer 176 is associated with the controlled device, which is taken to be the cutter of a machine tool, in such a manner as to develop a voltage which is a function of some factor in the cutting operation. By way of example, the transducer may represent a strain gage connected to the cutting tool holder in such a manner as to measure the torque exerted on the cutter. The electrical signal developed by this transducer is fed to an adaptive factor summer 178, which is disposed between the decode and hold unit 34 and the acceleration/deceleration network 36 in a line which carries VFR. The voltage from the transducer 176 is thereby combined with the VFR in such a manner as to modify the signal sent on the line 28 to the pulse generator 26. The unit 178 may treat the voltage developed by the transducer 176 so as to subtract it from VFR in order to decrease the cutting speed as the strain on the cutter increases, or it may be combined in some other manner such as addition or multiplication depending upon the factor which the transducer is measuring and its effect upon the operation.

When used in an adaptive system of this nature, the feed rate programmed by the operator may be modified to take into account the transducer factor. Thus, the cutting operation may be conducted at a rate conducive to maximum efficiency.

Having thus described our invention, we claim:

1. In a system operative to control the motion of an output member along a plurality of axes simultaneously in accordance with information contained on a record medium, which information includes a command number associated with each axis to be controlled, said system having a controller operative to receive the command numbers and to generate pulse trains having frequencies proportional to the ratios of the command numbers, and said controller being operative at a rate which is a function of an input pulse train, the improvement which consists of: a variable frequency pulse generator operative to supply pulses to the controller, said pulse generator being operative to supply pulses in accordance with the ratio of the magnitudes of first and second voltages; a feed rate command contained on the record medium; means for establishing a first voltage having a magnitude proportional to said feed rate command; means for receiving said command numbers and for generating a second voltage having a magnitude proportional to the geometric resultant of the motions to be generated in accordance with the command numbers, and means for supplying said first and second voltages to said variable frequency pulse generator.

2. In a system operative to control the motion of an output member along a plurality of axes simultaneously in accord with information contained on a record medium, said information including a plurality of numbers proportional to the end points of motion along the various axes and a coded representation of the rate at which the output motion is to occur, the improvement which consists of: first means for receiving said motion end points and generating a voltage having a magnitude proportional to the resultant path length of the output device; second means for receiving feed rate information from the tape and for generating a voltage having a magnitude proportional to said feed rate information; a controller operative to receive said end point indications and to generate trains of pulses having frequencies in the ratios of the end point indications, said frequencies being proportional to the rate of an input pulse train to said controller; and a variable frequency pulse generator operative to receive said two voltages and to provide an output pulse train to said controller having a frequency proportional to the ratio of said voltages.

3. In a system operative to control the motion of an output member along a plurality of axes simultaneously in accordance with information contained on a record medium, which information includes a command number associated with each axis to be controlled, said system having a controller operative to receive the command numbers and to generate pulse trains having frequencies proportional to the ratios of the command numbers, and said controller being operative at a rate which is a function of an input pulse train, the improvement which consists of: converter circuitry operative to receive said command numbers and to generate voltages having magnitudes proportional to said command numbers; a resultant computer having as its input said voltages proportional to the command numbers and providing as its output a voltage proportional to the orthogonal resultant of its input voltages; means for generating a voltage proportional to the desired motion rate of said output member; and a variable frequency pulse generator operative to supply pulses to the controller at a rate directly proportional to the magnitude of the voltage which is developed from the desired motion rate and inversely proportional to the voltage output of the resultant computer.

4. In a system operative to control the motion of an output member along a plurality of axes simultaneously in accordance with information contained on a record medium, said information including a plurality of numbers proportional to the end points of motion along the various axes and a coded representation of the rate at which the output motion is to occur, the system including a controller operative to receive said end point numbers and to generate a plurality of pulse trains, means for controlling the rate of operation of the controller, including: a variable frequency pulse generator operative to supply its output to the controller in such a manner as to adjust the operational rate of the controller; means for receiving said end point numbers and for generating a voltage proportional to the resultant motion commanded by said numbers; means for generating a voltage proportional to the representation of the rate at which the output motion is to occur; and means for controlling the pulse generator in accordance with the ratio between the resultant voltage and the rate voltage.

5. In a system having a controller operative to receive a plurality of command numbers and to provide a plurality of output signals which are operative to command motions at rates which are in the ratio of the command numbers, means for controlling the overall rate of operation of the controller, including: means for detecting the command numbers and for generating a first voltage having a magnitude proportional to the resultant path length of the motion which they command; means for generating a second voltage having a magnitude proportional to the desired resultant motion rate of the system; and means for operating the controller at a rate inversely proportional to said first voltage and directly proportional to said second voltage.

6. In a system operative to control the motion of an output member along a plurality of axes simultaneously in accordance with information contained on a record medium, said information including a plurality of numbers proportional to the end points of motion along the various axes and a coded representation of the rate at which the output motion is to occur, the improvement which consists of: first computer means for receiving said motion end points and generating a voltage having a magnitude proportional to the resultant path length of the output device; second means for receiving feed rate information from the tape and for generating a voltage having a magnitude proportional to said feed rate information; a controller operative to receive said end point indications and to generate trains of pulses having frequencies in the ratios of the end point indications, said frequencies all being proportional to the rate of an input pulse train to said controller; a low-pass filter operative to receive the voltage having a magnitude proportional to said feed rate information; and a variable frequency pulse generator which provides an output train to said controller at a rate directly proportional to the magnitude of the output of the filter and inversely proportional to the voltage which represents the resultant path length.

7. In a system operative to control the motion of an output member along a plurality of axes simultaneously in accordance with information contained on a record medium, said information including a plurality of numbers proportional to the end points of motion along the various axes and a coded representation of the rate at which the output motion is to occur, said system including a controller operative to receive the end point numbers and to generate a plurality of pulse trains, and a pulse multiplier operative to receive said pulse trains and to generate a corresponding number of pulse trains, each output train of said multiplier having either one or an integral multiple of the number of input pulses depending upon the nature of the coded information, the improvement which consists of: a variable frequency pulse generator operative to emit pulses at a rate directly proportional to the output motion rate coded on the tape and inversely proportional to the resultant motion path length; a pulse divider operative to receive the output of said pulse generator and to supply its output to the controller so as to control the pulse generation rate of said controller; means for establishing a pulse multiplication factor for said pulse multiplier; and means for causing said pulse divider to divide its input pulses by the pulse multiplication factor.

8. In a system operative to control the motion of an output member along a plurality of axes simultaneously in accordance with information contained on a record medium, said information including a plurality of numbers proportional to the end points of motion along the various axes and a coded representation of the rate at which the output motion is to occur, said system including a controller operative to receive the end point numbers and to generate a plurality of pulse trains, and a pulse multiplier operative to receive said pulse trains and to generate a corresponding number of pulse trains, each output train of said multiplier having either one or an integral multiple of the number of input pulses depending upon the nature of the coded information, the improvement which consists of: a variable frequency pulse generator operative to emit pulses at a rate directly proportional to the output motion rate coded on the tape and inversely proportional to the resultant of the motion as determined by the command numbers; a pulse divider operative to receive the output of said pulse generator and to supply its output to the controller so as to control the pulse generation rate of said controller; means for establishing a pulse multiplication factor for said pulse multiplier; and means for causing said pulse divider to divide its input pulses by the pulse multiplication factor.

9. In a system operative to control the motion of an output member along a plurality of axes simultaneously in accordance with information contained on a record medium, said information including a plurality of numbers proportional to the end points of motion along the various axes and a coded representation of the rate at which the output motion should ideally occur in said system, including a controller operative to generate a plurality of pulse trains at a rate proportional to an input pulse train to said controller, the improvement which comprises: a transducer operative to sense a condition associated with the motion operation and to provide an output voltage having a property which is a function of that condition; means for generating a voltage having a property proportional to the resultant motion length commanded by said end point numbers; and a variable frequency pulse generator operative to supply said pulse train to the controller, said pulse generator being controlled at a rate inversely proportional to said resultant motion length and as direct functions of both the transducer output voltage and the rate representation coded on the tape.

10. In a system operative to control the motion of an output member along a plurality of axes simultaneously in accordance with information contained on a record medium, said information including a plurality of numbers proportional to the end points of motion along the various axes and a coded representation operative to control the output motion rate, the system including a controller operative to receive the end point numbers and to generate a plurality of said pulse trains equal to said end point numbers at a rate proportional to the frequency of an input pulse train, the improvement which comprises: a first computer operative to receive the end point indications and to generate a voltage proportional to the resultant path length commanded by said end point numbers; a transducer operative to sense a condition associated with the motion and to provide an output voltage having a property which is a function of said condition; a second computer operative to receive the feed rate representation coded on the tape and the output of the transducer and to provide a voltage having a magnitude which is a function of both inputs; and a variable frequency pulse generator operative to supply a rate controlling pulse train to said controller, having as its inputs the outputs of said first and second computers and being operative to generate pulses at a rate proportional to the ratio of said first and second computer outputs.

11. In a system operative to control the motion of an output member along a plurality of axes simultaneously in accordance with information contained on a record medium, said information including a plurality of numbers proportional to the end points of motion along the various axes and a coded representation of the rate at which the output motion should ideally occur, the system including a controller operative to generate a plurality of pulse trains at a rate proportional to an input pulse train, the improvement which consists of: a transducer operative to sense conditions associated with the motion operation; a computer operative to receive the end point indications and the rate representation from the tape and the output of said transducer and to generate a signal which is a function of its inputs; and a variable frequency pulse generator operative to provide a pulse input to said controller as a function of the output of said computer.

No references cited.